(12) United States Patent
Chen et al.

(10) Patent No.: US 8,581,562 B2
(45) Date of Patent: Nov. 12, 2013

(54) SIDO POWER CONVERTER AND DRIVING METHOD THEREOF

(75) Inventors: Ke-Horng Chen, New Taipei (TW); Yu-Huei Lee, New Taipei (TW); Shih-Jung Wang, Taipei (TW); Yao-Yi Yang, Changhua County (TW); Ying Hsi Lin, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 123 days.

(21) Appl. No.: 13/304,464

(22) Filed: Nov. 25, 2011

(65) Prior Publication Data

US 2012/0169307 A1  Jul. 5, 2012

(30) Foreign Application Priority Data

Dec. 30, 2010 (TW) .............................. 99146800 A

(51) Int. Cl.
*G05F 1/00* (2006.01)
*G05F 3/16* (2006.01)

(52) U.S. Cl.
USPC ........... 323/282; 323/222; 323/223; 323/224; 323/281; 323/283; 323/284; 323/285

(58) Field of Classification Search
USPC .................. 323/222–226, 271–277, 281–286
See application file for complete search history.

(56) References Cited

U.S. PATENT DOCUMENTS

| 5,481,178 | A  | * | 1/1996  | Wilcox et al. ................. 323/287 |
|-----------|-----|---|---------|----------------------------------------|
| 6,166,527 | A  | * | 12/2000 | Dwelley et al. ............... 323/222 |
| 6,476,589 | B2 | * | 11/2002 | Umminger et al. ........... 323/282 |
| 6,522,110 | B1 | * | 2/2003  | Ivanov ........................... 323/267 |
| 6,737,838 | B2 | * | 5/2004  | Sluijs et al. ................... 323/225 |
| 7,132,765 | B2 |   | 11/2006 | Premont et al. |
| 7,265,524 | B2 | * | 9/2007  | Jordan et al. .................. 323/225 |
| 7,495,419 | B1 | * | 2/2009  | Ju ................................. 323/259 |
| 7,723,965 | B2 | * | 5/2010  | Lesso et al. .................... 323/225 |
| 2004/0201281 | A1 |   | 10/2004 | Ma et al. |
| 2008/0055946 | A1 | * | 3/2008  | Lesso et al. ..................... 363/63 |
| 2008/0303499 | A1 | * | 12/2008 | Chen et al. ..................... 323/282 |
| 2009/0066301 | A1 | * | 3/2009  | Oswald et al. ................ 323/271 |
| 2009/0108823 | A1 | * | 4/2009  | Ho et al. ........................ 323/282 |
| 2010/0079127 | A1 | * | 4/2010  | Grant ............................ 323/285 |

OTHER PUBLICATIONS

Le, Hanh-Phuc et al., A Single-Inductor Switching DC-DC Converter With Five Outputs and Ordered Power-Distributive Control, IEEE J. Solid-State Circuits, Dec. 2007, vol. 42, No. 12. pp. 2706-2714.

(Continued)

*Primary Examiner* — Timothy J Dole
*Assistant Examiner* — Yusef Ahmed
(74) *Attorney, Agent, or Firm* — Morris Manning & Martin LLP; Tim Tingkang Xia, Esq.

(57) ABSTRACT

The present invention relates to a Single Inductor Double Output (SIDO) power converter, which includes a power-stage circuit, a current detector, a slope compensation device, at least two error amplifiers, a comparing unit, a mode exchange circuit, a logical device and a driver. The SIDO current converter achieves an optimal SIDO power converting efficiency by controlling a full-current mode. Furthermore, different power transferring modes, under a variety of loadings, are used to address the issue of cross regulation and at meanwhile solving output voltage ripples and transient response to ensure the SIDO power converter a more flexible usage environment and better output performance.

13 Claims, 8 Drawing Sheets

(56) References Cited

OTHER PUBLICATIONS

Ma, Dongsheng et al., A Pseudo-CCM/DCM SIMO Switching Converter With Freewheel Switching, IEEE J. Solid-State Circuit, Jun. 2003, vol. 38, No. 6, pp. 1007-1014.

Intellectual Property Office, Ministry of Economic Affairs, R.O.C., "Office Action", Jul. 17, 2013, Taiwan.

Kwang-Chan Lee et al., A PLL-Based High-Stability Single-Inductor 6-channel Output DC-DC Buck Converter, IEEE Xplore Digital Library, 2010, IEEE International Solid-State Circuits Conference, Session 10, DC-DC Power Conversion/10.3.

* cited by examiner

SIDO POWER CONVERTER AND DRIVING METHOD THEREOF

CROSS-REFERENCE TO RELATED APPLICATIONS

This non-provisional application claims priority under 35 U.S.C. §119(a) on Patent Application No. 099146800 filed in Taiwan R.O.C., on Dec. 30, 2010, the entire contents of which are hereby incorporated by reference.

BACKGROUND OF THE INVENTION

1. Field of the Invention

The present invention relates to a Single Inductor Double Output (SIDO) power converter and driving method thereof, more particularly, a SIDO power converter with low cross regulation and low energy loss and driving method thereof.

2. Description of the Prior Arts

The power management IC is widely used in the portable electronic products, such as mobile phones, PDAs, even notebook computers, etc., and therefore the power management is a very important and very active study topic in the electronic field. The industry always cares about how to make the battery has the longest life and the optimum efficiency so as to obtain the perfect product and enhance the product competitive abilities. The configuration of SIDO power converter is distinct from the tradition DC to DC converter and the SIDO power converter may decrease the usage of the external elements (for example, inductors) for saving cost and enhancing the product competitive abilities. By reducing the usage of the inductors, the size of the PCB board will shrink to achieve the final goal of the portable product micromation. Simultaneously, under the tendency of the system on chip (SoC), it needs to input a power source into the system for the power management module, and then provides the different voltage to the different systems or circuits according to the actual requirement and design. Thereby, in accordance with the SIDO configuration (or multiple output voltages), it merely needs to use a single power management module and the smaller external energy storage elements (for example, inductors and capacitors) to achieve the perfect power convert for obtaining a steady output voltage and a required output current and performing the more efficient use of the battery.

The prior art applies the pseudo-CMM current technology for actualizing the SIDO configuration (multiple outputs) because of the cross regulation and the system stability, for example, U.S. Patent Application 2004/0201281 A1 and IEEE J. Solid-State Circuit, Vol. 38, NO. 6, pp. 1007-1014, June, 2003. Thereby, the entire system does not have the discontinuous current mode (DCM) causing the entire system is easy to steady, and moderately solve the problem of cross regulation based on the small current (equivalent to zero inductor current of DCM). However, it needs to add freewheel section during the entire plus width modulation (PWM) period for achieving the control technology mentioned above. And in actual design and requirement, most of the power will be lost in the freewheel section because of the equivalent resistance effect of non-ideal switch, and therefore the conduction loss of the entire circuit system is increased so as to affect the energy conversion efficiency. Especially when the inductor needs to accept the higher current, the conduction loss becomes more serious ($P_{con}=I^2R_{on}$). Additionally, the energy stored in the inductor can not transfer to the output terminal because the freewheel section joined, and therefore the average current of the inductor is larger than the sum of the current from the loads of the output terminals. Moreover, due to the characteristic of DCM on the output terminal of the inductor in the SIDO module, the higher average current causes the higher output voltage ripper generated, and it may need a post-stage steady circuit to steady the voltage ripper. This is hardly satisfactory.

IEEE J. Solid-State Circuits, Vol. 42, No. 12. pp. 2706-2714, Dec. 2007, the prior art also discloses an energy distribution process with priority operation for achieving the SIDO (multiple output) configuration. However, this configuration only applies in certain kinds of loadings, and the output voltage controlled by the comparator in this configuration relative to the voltage controlled by the error amplifier in the closed loop, the entire load regulation (line regulation) is no good.

Accordingly, in view of the above drawbacks, the present invention provides a SIDO power converter and driving method thereof, more particularly, a SIDO power converter with low cross regulation and low energy loss and driving method thereof, which solves the drawbacks as the foregoing.

SUMMARY OF THE INVENTION

In view of the foregoing, it is primary object of the present invention to provide a Single Inductor Double Output (SIDO) power converter, and the SIDO power converter may achieve the perfected power convert effect by controlling the full current mode. Simultaneously, the SIDO power converter has perfect steady voltages with the perfect steady-state response and transient state response.

The secondary object of the present invention is related the driving method for a SIDO power converter, which is used for solving the cross regulation in the different loads, and simultaneously improving the output voltage ripple and the transient state response. Thereby, the power manager module of the SIDO power converter has good adjustability and output stability so as to raise product competitive.

The thirdly object of the present invention is to decrease the number of the switch in the power-stage switch. The present invention does not use freewheel section to achieve the system steady and good responses, and therefore the usage times of the power-stage switch is increased (that means the power-stage switch is used in the freewheel section). And it simultaneously decreases the number of the power-stage (especially by the switches respectively located at two sides of the inductor) so as to decrease the conduction loss of the switch and allow the power manager chip to high-effectively perform the transfer process.

The fourthly object of the present invention is to decrease the conduction loss. The average current of the inductor in the present invention is smaller than the traditions system because the present invention do not use the freewheel technology.

The fifthly object of the present invention is to decrease the voltage ripper.

The sixthly object of the present invention is to use at least two error amplifiers to respectively response the state of load on the output terminals so as to obtain the steady status and the steady multiple output voltages.

Thereby, the present invention is related to a Single Inductor Double Output (SIDO) power converter, comprising: a power-stage circuit, comprising an inductor, a first output terminal and a second output terminal; a first error amplifier, coupled to the first output terminal, for outputting a first error signal; a second error amplifier, coupled to the second output terminal, for outputting a second error signal; a current sensing circuit, for detecting a current from one side of the inductor and outputting a first signal; and a comparing unit, coupled to the power-stage circuit and the current sensing circuit, for receiving the first error signal, the second error signal and the first signal, and adding the first error signal to the second error signal for generating a third error signal, and then respectively comparing the first signal with the first error signal, the second error signal and the third error signal for generating a first comparison signal, a second comparison signal and a third comparison signal; wherein the power-stage circuit determines and selects the energy transfer path according to the first, second and third comparison signals.

Moreover, the present invention is related to a driving method for a Single Inductor Double Output (SIDO) power converter, further comprising: generating a first error signal, a second error signal and a first signal; adding the first error signal to the second error signal for generating a third error signal; and respectively comparing the first signal with the first error signal, the second error signal and the third error signal for generating a first comparison signal, a second comparison signal and a third comparison signal.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become readily understood from the detailed description given herein below and the accompanying drawings which are given by way of illustration only, and thus are not limitative of the present invention and wherein.

DESCRIPTION OF THE EXEMPLARY EMBODIMENTS

The following descriptions are of exemplary embodiments only, and are not intended to limit the scope, applicability, or configuration of the invention in any way. Rather, the following description provides a convenient illustration for implementing exemplary embodiments of the invention. Various changes to the described embodiments may be made in the function and arrangement of the devices described. For your esteemed members of reviewing committee to further understand and recognize the fulfilled functions and structural characteristics of the invention, several exemplary embodiments cooperating with detailed description are presented as follows.

Figure 1:
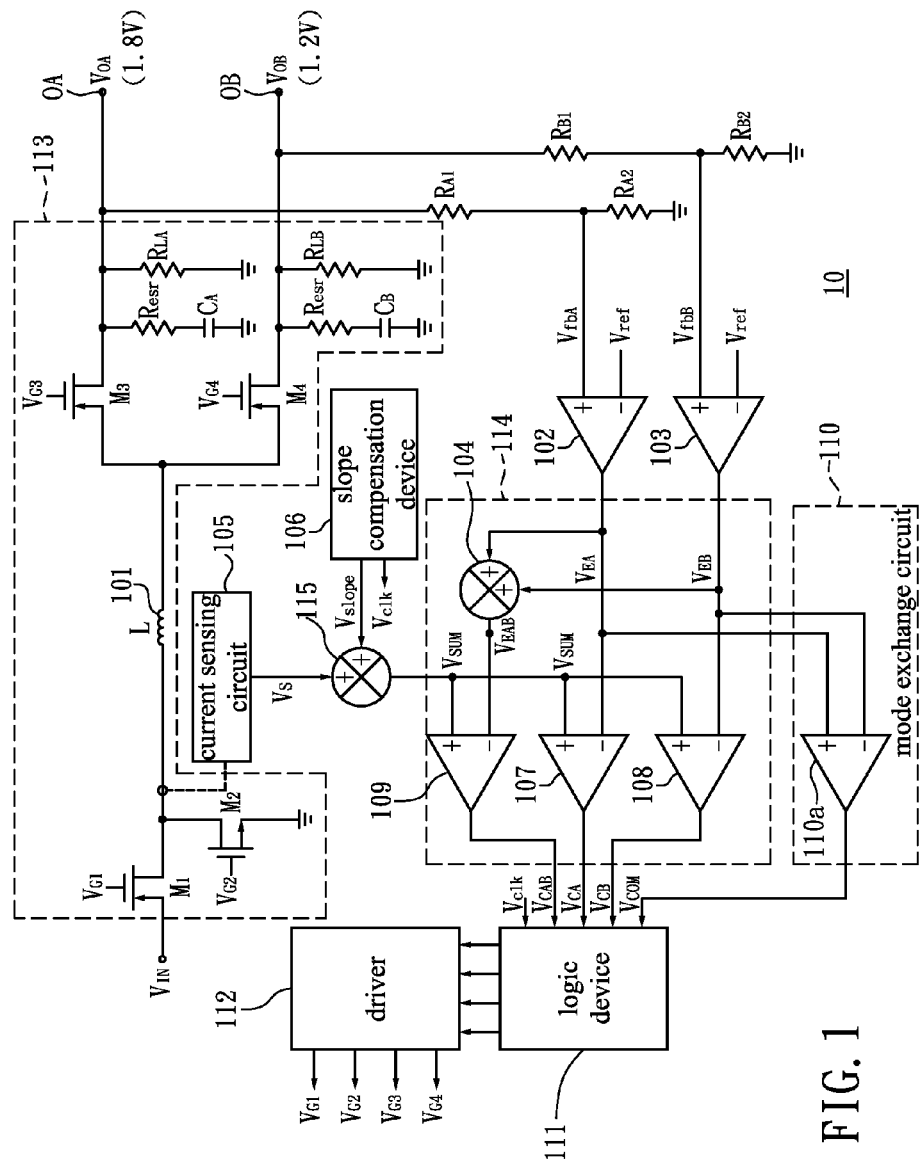
FIG. 1 illustrates a Single Inductor Double Output (SIDO) power converter 10 according to one embodiment of the present invention.

FIG. 1 illustrates a Single Inductor Double Output (SIDO) power converter 10 according to one embodiment of the present invention. The SIDO power converter 10 comprises: a power-stage circuit 113, the first error amplifier 102, a second error amplifier 103, a current sensing circuit 105, a slope compensation device 106 and a comparing unit 114. The power-stage circuit 113 comprises an inductor 101, a first output terminal OA and a second output terminal OB. Specifically, the inductor 101 is used for forming a DC to DC converter with two output voltages. The first error amplifier 102 is coupled to the first output terminal OA for outputting a first error signal $V_{EA}$. The second error amplifier 103 is coupled to the second output terminal OB for outputting a second error signal $V_{EB}$. The current sensing circuit 105 is used for detecting a current on the first terminal of the inductor 101 and outputting a first signal $V_S$. The slope compensation device 106 is used for outputting a second signal $V_{Slope}$, and wherein the adder 115 adds the first signal $V_S$ to the second signal $V_{Slope}$ for getting an reference signal $V_{SUM}$. However, the slope compensation device 106 is not a necessary element in actual requirement and design because a slope compensation signal is added into the control voltage for maintaining the system stability, preventing to generate the subharmonic oscillation and providing the feedforward control. The comparing unit 114 coupled to the power-stage circuit 113 and the current sensing circuit 105 is used for receiving the first error signal $V_{EA}$, the second error signal $V_{EB}$, the reference signal $V_{SUM}$ (or the first signal $V_S$). Specifically, the first error signal $V_{EA}$ is added to the second error signal $V_{EB}$ for generating a third error signal $V_{EAB}$, and then the reference signal $V_{SUM}$ (or the first signal $V_S$) is compared with the first error signal $V_{EA}$ for generating a first comparison signal $V_{CA}$, or the reference signal $V_{SUM}$ (or the first signal $V_S$) is compared with the second error signal $V_{EB}$ for generating a second comparison signal $V_{CB}$, or the reference signal $V_{SUM}$ (or the first signal $V_S$) is compared with the third error signal $V_{EAB}$ for generating a third comparison signal $V_{CAB}$. As shown in FIG. 1, the comparing unit 114 further compares at least three comparators 107, 108, 109 and an adder 104. The adder 104 is used for receiving the first error signal $V_{EA}$ and the second error signal $V_{EB}$, and then adds first error signal $V_{EA}$ to the second error signal $V_{EB}$ for getting the third error signal $V_{CAB}$. And the first comparator 107 is used for receiving the reference signal $V_{SUM}$ (or the first signal $V_S$) and the first error signal $V_{EA}$, and the reference signal $V_{SUM}$ (or the first signal $V_S$) in the first comparator 107 is compared with the first error signal $V_{EA}$ for generating the first comparison signal $V_{CA}$; the second comparator 108 is used for receiving the reference signal $V_{SUM}$ (or the first signal $V_S$) and the second error signal $V_{EB}$, and the reference signal $V_{SUM}$ (or the first signal $V_S$) in the second comparator 108 is compared with the second error signal $V_{EB}$ for generating the second comparison signal $V_{CB}$; the third comparator 109 is used for receiving the reference signal $V_{SUM}$ (or the first signal $V_S$) and the third error signal $V_{EAB}$, and the reference signal $V_{SUM}$ (or the first signal $V_S$) in the third comparator 109 is compared with the third error signal $V_{EAB}$ for getting the third error signal $V_{CAB}$. Specifically, the power-stage circuit 113 determines the energy transfer paths according to the first, second and third comparison signals $V_{CA}$, $V_{CB}$, $V_{CAB}$.

The SIDO power converter 10 further comprises a mode exchange circuit 110 and a logic device 111. The mode exchange circuit 110 is used for receiving the first error signal $V_{EA}$ and the second error signal $V_{EB}$ and comparing the first error signal $V_{EA}$ with the second error signal $V_{EB}$ for generating a switch signal $V_{COM}$. The logic device 111 is used for receiving the first, second and third comparison signals $V_{CA}$, $V_{CB}$, $V_{CAB}$ for generating a first path signal and a second path signal, and further the logic device 111 selects one of the first path signal and the second path signal according to the switch signal $V_{COM}$. Additionally, the SIDO power converter 10 controls the two error amplifiers 102, 103 to response the output states of the tow loads, and therefore the system will obtain two steady voltages with the perfect steady-state response and transient state response during the system operation.

The SIDO power converter 10 mainly implements the current programmed control in the power management module of the SIDO system. It respectively obtains the first error signal $V_{EA}$ and the second error signal $V_{EB}$ by controlling the two error amplifiers 102 and 103, and then the adder 104 adds the first error signal $V_{EA}$ to the second error signal $V_{EB}$ for defining the sum of the two error signals in the Pulse width modulation (PWM) period. Moreover, the reference signal $V_{SUM}$ (or the first signal $V_S$) generated from the current sensing circuit 105 and the slope compensation 106 will being respectively compared with the first error signal $V_{EA}$, the second error signal $V_{EB}$ and the third error signal $V_{EAB}$ (the sum of the first error signal $V_{EA}$ and the second error signal $V_{EB}$) via the comparators 107, 108 and 109 for obtaining the corresponded duty periods so as to achieve the steady output voltage effect. Finally, the comparison signals from the comparators 107, 108 and 109 in the comparing unit 114 are transmitted to the logic device 111 and the driver 112 so as to driver the power-stage circuit 103. Therefore, the charge and discharge operation of the inductor 101 will be operated so as to transmit the energy from the input terminal ($V_{IN}$) to the output terminals ($V_{OA}$ and $V_{OB}$) by the charge operation and discharge operation of the inductor 103. The logic device 111 further comprises at least three D-type flip-flops, at least two decoders and a multiplexer, and the operation process of the logic device 111 will be discussed later. Moreover, as shown in FIG. 1, the comparator 110a in the mode exchange circuit 10 is used for comparing the $V_{EA}$ with $V_{EB}$ for generating a switch signal $V_{COM}$ so as to accomplish the mode exchange of the SIDO power converter 10. The implementation and principle are about the mode exchange will also be discussed later.

Figure 2A:
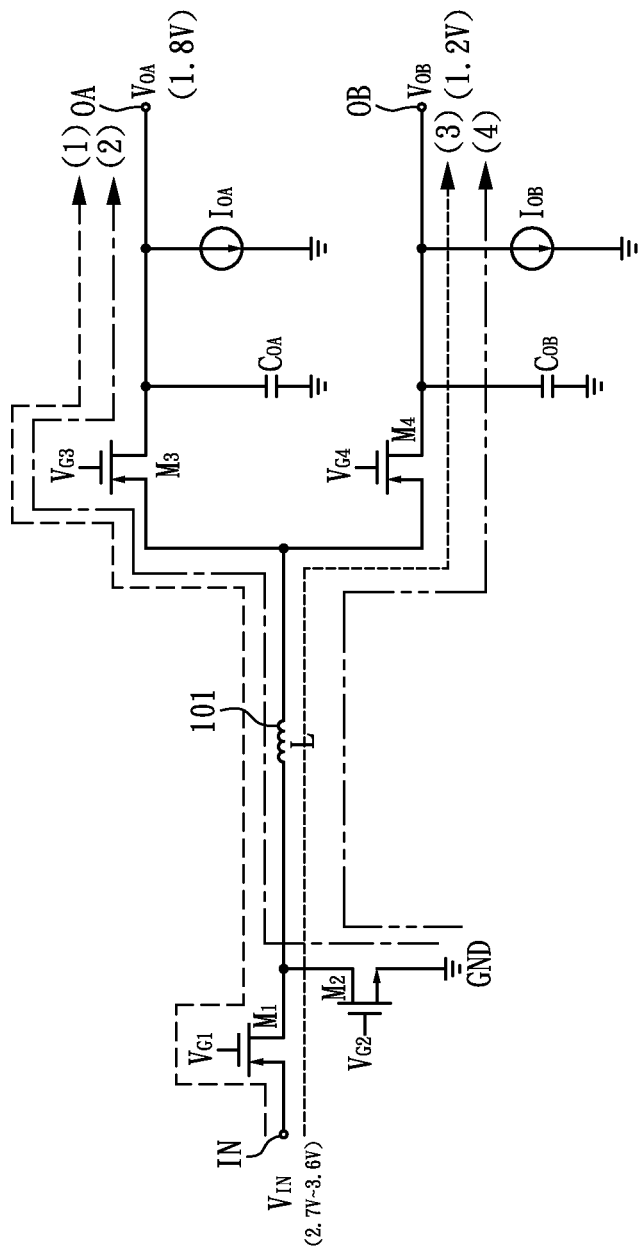
FIG. 2A illustrates the power-stage circuit 113 according to one embodiment of the present invention.

FIG. 2A illustrates the detailed circuit diagram of the power-stage circuit 113 according to one embodiment of the present invention. The power-stage circuit 113 comprises: a first switch $M_1$, a second switch $M_2$, a third switch $M_3$ and a fourth switch $M_4$. The first switch $M_1$ is coupled between a first terminal of the inductor 101 and an input terminal IN. The second switch $M_2$ is coupled to the first terminal of the inductor 101 and a ground terminal GND. The third switch $M_3$ is coupled to a second terminal of the inductor 103 and the first output terminal OA. The fourth switch $M_4$ is coupled between the second terminal of the inductor 103 and a second terminal OB. There is one input voltage $V_{IN}$ locating on the input terminal IN of the power-stage circuit 113, and output voltages $V_{OA}$ and $V_{OB}$ are respectively located on the first output terminal OA and the second output terminal OB. Specifically, the $I_{OA}$ and $I_{OB}$ respectively represent the loading current on the first output terminal OA and the second output terminal OB, and $C_{OA}$ and $C_{OB}$ respectively represent the capacitance of the output terminal $V_{OA}$ and $V_{OB}$. Hence, the four energy transfer paths (1)-(4) are generated during the charge operation and the discharge operation of the power-stage circuit 113 and the current of the inductor 101 is $(1/L) \cdot \int V(t)d(t)$. Specifically, when the first switch $M_1$ and the third switch $M_3$ are ON and the second switch $M_2$ and the fourth switch $M_4$ are OFF, it generated the energy transfer path (1); when the second switch $M_2$ and the third switch $M_3$ are ON and the first switch $M_1$ and the fourth switch $M_4$ are OFF, it generated the energy transfer path (2); when the first switch $M_1$ and the fourth switch $M_4$ are ON and the second switch $M_2$ and the third switch $M_3$ are OFF, it generated the energy transfer path (3); when the second switch $M_2$ and the fourth switch $M_4$ are ON and the first switch $M_1$ and the third switch $M_3$ are OFF, it generated the energy transfer path (4).

Figure 2B:
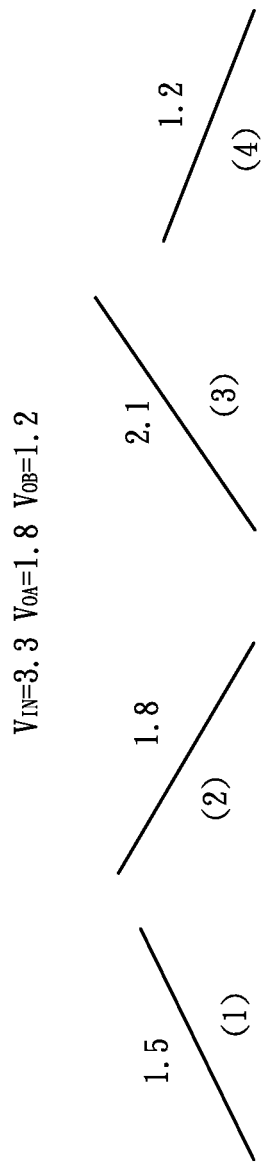
FIG. 2B illustrates the slope of the four energy transfer path of FIG. 2A.
Figure 3:
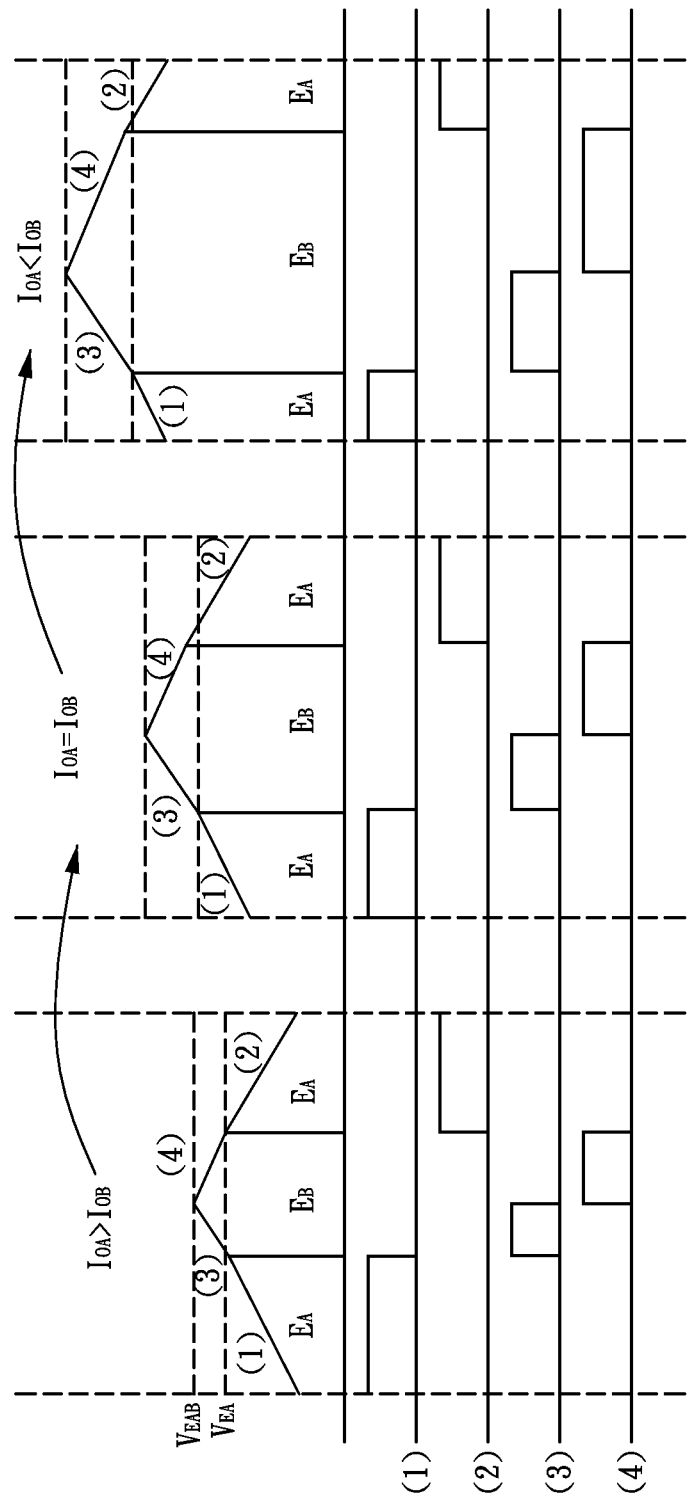
FIG. 3 illustrates the energy transfer sequence diagram according to one embodiment of the present invention.

Suppose that the input voltage of the power-stage circuit is 3.3V, and the output voltages are 1.8V and 1.2V, and therefore there are four energy transfer paths (1)-(4), as shown in FIG. 2A. FIG. 2B illustrates the slope of the charge and discharge on the inductor 103 corresponding the four energy transfer paths (1)-(4). Thereby, it simultaneously transfers the energy to the two different output terminals by a common period and the energy paths arrangement. For example, it selects the path arrangement: path (1)→path (3)→path (4)→path (2) for obtaining the energy transfer sequence diagram, as shown in FIG. 3. Specifically, the order of path (1) is the input terminal IN→the first switch $M_1$→the inductor 101→the third switch $M_3$→the output terminal OA; the order of path (2) is the input terminal IN→the second switch $M_2$→the inductor 101→the third switch $M_3$→the output terminal OA; the order of path (3) is the input terminal IN→the first switch $M_1$→the inductor 101→the fourth switch $M_4$→the output terminal OB; the order of path (4) is input terminal IN→the second switch $M_2$→the inductor 101→the fourth switch $M_4$→the output terminal OB.

FIG. 3 illustrates the energy transfer sequence diagram according to one embodiment of the present invention. In the embodiment, as shown at the left of FIG. 3, the area of the energy $E_A$ is larger than the energy $E_B$ because of the loading current $I_{OA}>I_{OB}$, and it represents that the $V_{OA}$ on the output terminal OA is larger the $V_{OB}$ the output terminal OB. In other words, the energy stored on the output terminal OA is larger than output terminal OB. However, if the loading current $I_{OA}$ on the output terminal OA is being maintained and the loading current $J_{OB}$ on the output terminal OB is being increased, the $J_{OB}$ will be equal to $I_{OA}$ and then the tow error signals ($V_{EA}=V_{EB}$) from the error amplifiers 102 and 103 are added together meanwhile the current on the inductor 103 is equivalent with the sum of the loading currents ($I_{L,avg}=I_{OA}+I_{OB}$). Subsequently, if the loading current $I_{OB}$ on the output terminal OB has been increasing, the $J_{OB}$ will be larger than $I_{OA}$ and the energy $E_A$ is also larger than $E_B$/B meanwhile the current is also being increased so as to satisfy loading requirements of the two output terminals. The present invention can adjust the average current of the inductor according to the loads located on the two output terminals, and use the energy transfer path to simultaneously provide energy to the two different output terminals at the same PWM period for achieving the perfected effect of the SIDO power converter.

Figure 4A:
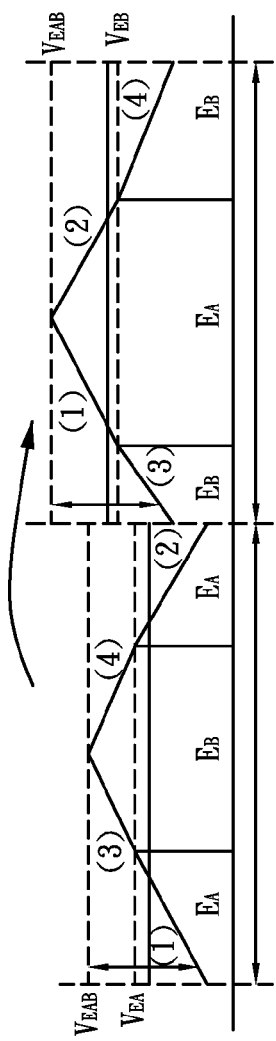
FIG. 4A/B illustrates the detailed current switch mode of the energy transfer path being path (1)→path (3)→path (4)→path (2)
Figure 4B:
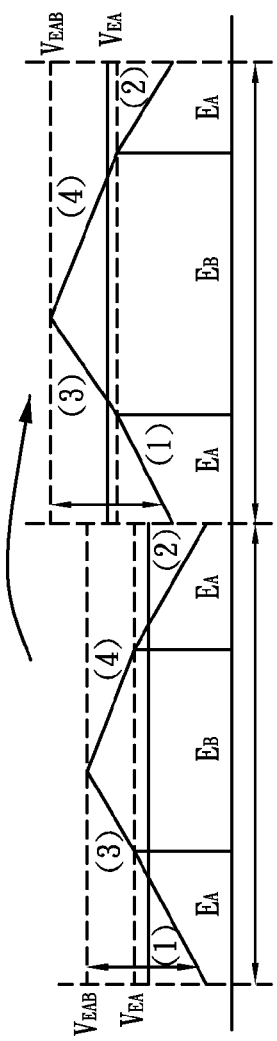

FIG. 4A/B illustrates the detailed current switch mode of the energy transfer path being path (1)→path (3)→path (4)→path (2). When it starts the PWM period, the current of inductor is transmitted to the output terminal OA so as to generate the energy $V_{OA}(E_A)$, and when the energy $V_{OA}$ is equal to the energy provided by the inductor and the energy stored in the output terminal OA reaches the saturation (for example, as the energy $V_{OA}$ is compared with the error signal $V_{EA}$), the current of inductor is transferred to the output terminal OB so as to generate the energy $V_{OB}(E_B)$. If the loads on the output terminal OB is increased (that means $I_{OB}$ increased) and the loads on the output terminal OA has been maintained (that means that means $I_{OA}$ maintained), the entire current of the inductor will be increased and the duty period region of the output terminal OA becomes narrower, and the duty period region of the output terminal OB becomes wider, as shown in FIG. 4B. However, if the loads on the output terminal OA is increased (that means $I_{OA}$ increased) and the loads on the output terminal OB has been maintained (that means $I_{OB}$ maintained), the entire current of the inductor will be increased and the duty period region of the output terminal OA becomes wider, and the duty period region of the output terminal OB becomes narrower, as shown in FIG. 4A. Meanwhile, the energy transfer path: path (1)→path (3)→path (4)→path (2) was transferred to the energy transfer path: path (3)→path (1)→path (2)→path (4). Therefore, the technology disclosed by the present invention will always satisfy the output from the light loading, and then satisfy the output from the heavy loading. For example, in the embodiment, if the $I_{OA}$ is bigger and it represents $V_{EA} > V_{EB}$, and the output signal $V_{COM}$ from the comparator 110a means the $V_{OA}$ is the heavy loading, and the $V_{OB}$ is the light loading meanwhile the energy transfer path is (3)(1)(4)(2) (it needs to charge to $V_{OA}$); if the $I_{OB}$ is bigger and it represents $V_{EB} > V_{EA}$, and the output signal $V_{COM}$ from the comparator 110a means the $V_{OB}$ is the heavy loading, and the $V_{OA}$ is the light loading meanwhile the energy transfer path is (1)(3)(4)(2) (it needs to charge to $V_{OB}$). Thereby, the cross regulation of the entire system is decreased.

Figure 5A:
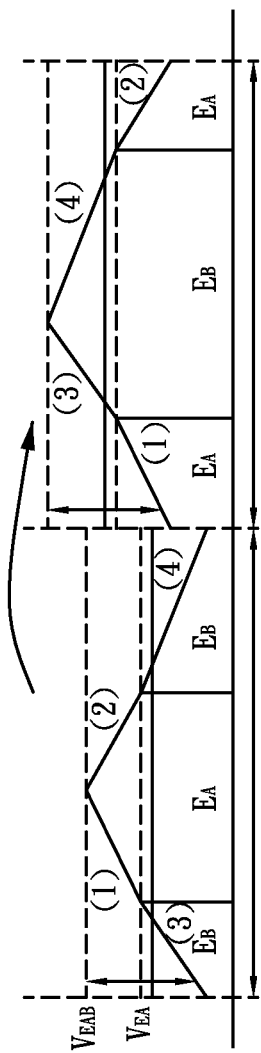
FIG. 5A/B illustrates the detailed current switch mode of the energy transfer path being path (3)→path (1)→path (4)→path (2)
Figure 5B:
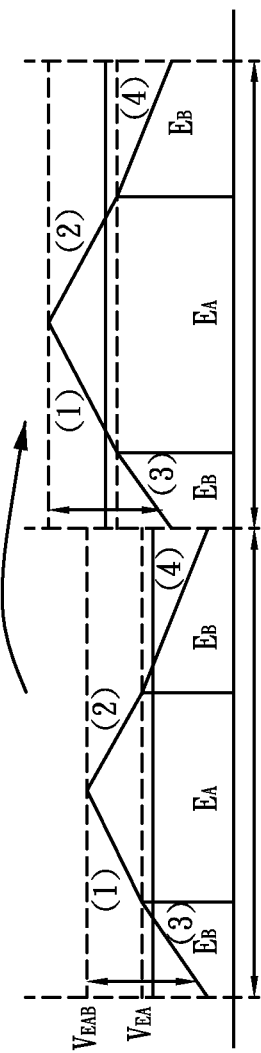

FIG. 5A/B illustrates the detailed current switch mode of the energy transfer path being path (3)→path (1)→path (4)→path (2). If it only increases the loading on the output terminal OA, and the energy transfer arrangement path: path (3)→path (1)→path (2)→path (4) is maintained for transferring the current from the inductor L. However, the average current $I_{L,avg}$ from inductor L is increased for providing the energy on the loads of the two output terminals OA and OB, as shown in FIG. 5B. If it only increases the loading on the output terminal OB, the average current $I_{L,avg}$ from inductor L is increased and the energy transfer path will be converted, and the changed energy transfer arrangement path is path (1)→path (3)→path (4)→path (2) for decreasing the cross regulation of the entire system, as shown in FIG. 5A.

Figure 6:
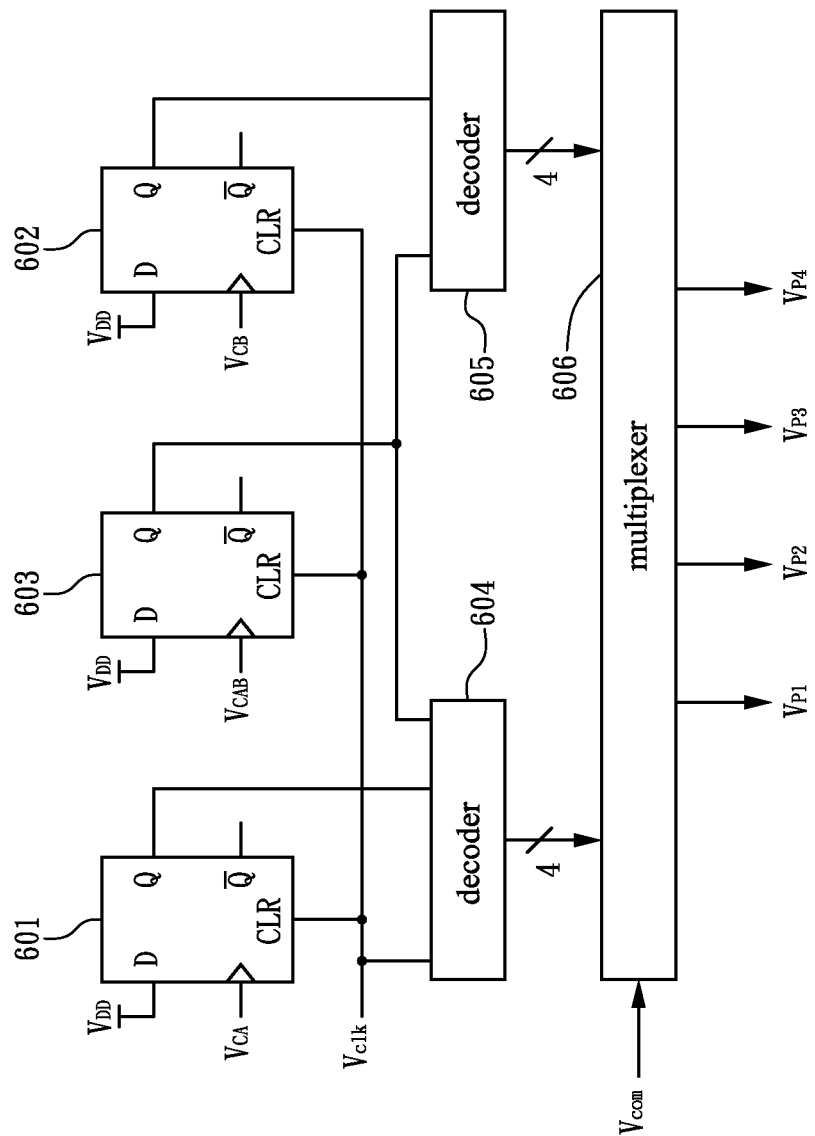
FIG. 6 illustrates the logic device 111 according to one embodiment of the present invention.

FIG. 6 illustrates the logic device 111 according to one embodiment of the present invention. The logic device 111 comprises: the at least three D-type flip-flops 601, 602 and 603, the least two decoders 604, 605 and a multiplexer 606. The at least three D-type flip-flops 601, 602 and 603 are used for receiving the first, second and third comparison signals $V_{CA}$, $V_{CB}$ and $V_{CAB}$ from the at least three D-type flip-flops, and outputting the first group of path signals and the second group of path signals with 4 bits. The multiplexer 606 selects one of the first group of path signals and the second group of path signals according to the switch signal $V_{COM}$. Specifically, the first group of path signals (for example, (1)(3)(4)(2)) or the second group of path signals (for example, (3)(1)(4)(2)) comprises a plurality of path signals $V_{P1}$, $V_{P2}$, $V_{P3}$, $V_{P4}$. In addition, the logic device 111 further receives a PWM period ($V_{clk}$) for resetting the three flip-flops, and in the PWM period, the inductor will be performing the charge and discharge operation between the first output terminal OA and the second output terminal OB so as to perform the energy transfer process of the path 1342 or 3124. In the embodiment, the three D flip-flops 601, 602 and 603 receive the comparison signals $V_{CA}$, $V_{CB}$ and $V_{CAB}$ from the three comparators 107, 108 and 109, and then process the comparison signals according to the characteristics of the flip-flop. The three D flip-flops will being reset during the PWM period, and then record the output result from the comparators 107, 108 and 109, and the decoders 604 an 605 are used for respectively receiving the four path signals. Lastly, the multiplexer 606 selects the path signals to set and control the energy transfer path switch. In other words, the energy transfer arrangement path: path (1)→path (3)→path (4)→path (2) and the energy transfer arrangement path: path (3)→path (1)→path (2)→path (4) will be converted each other for satisfying the output from the heavy loading, and then satisfying the output form the light loading in the SIDO power converter 10 so as to decrease the cross regulation in the SIDO power converter 10.

Figure 7A:
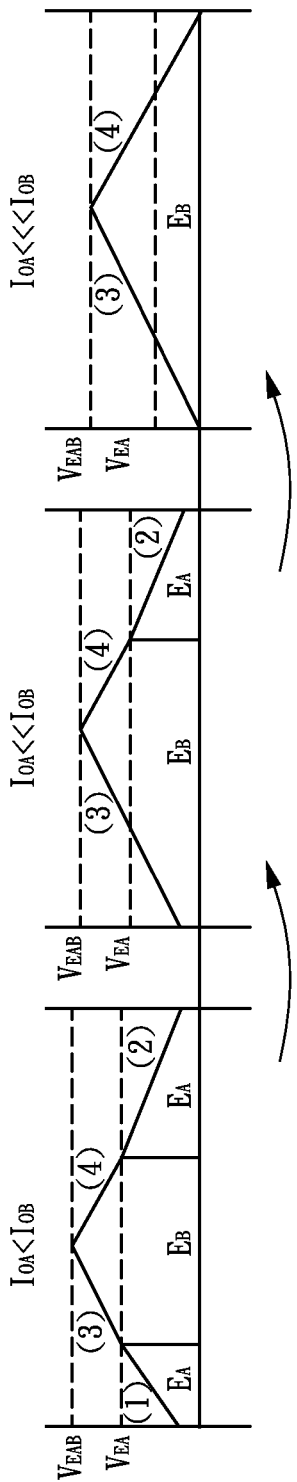
FIG. 7A/B illustrates the bypass transfer switch mechanism according to the present invention.

Additionally, in order to increase the effect of the entire power converter, the present invention further discloses the bypass transfer switch mechanism. When the loading current $I_{OB}$ is larger than the loading current $I_{OA}$, the energy transfer path: path (1)→path (3)→path (4)→path (2) is selected for transferring the energy to the output terminals, as shown FIG. 7A. When the difference between the loading current $I_{OA}$ and $I_{OB}$ gets wider, the system will automatically bypass the path (1) and the entire system merely use the energy transfer path: path (3)→path (4)→path (2) to transfer the energy to the output terminals. If the difference between the loading current $I_{OA}$ and $I_{OB}$ gets more wider, this only remains the energy path: path (3)→path (4) to transfer energy to the output terminals.

Figure 7B:
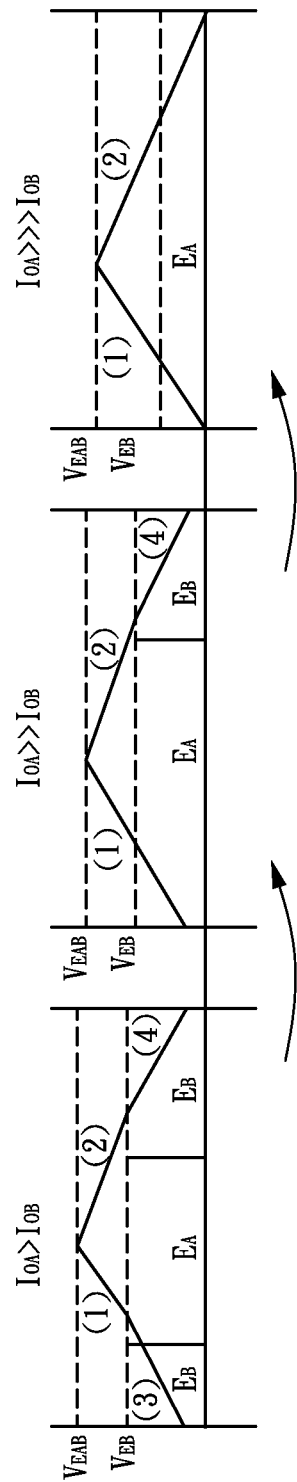

Similarly, When the loading current $I_{OA}$ is larger than the loading current $I_{OB}$, the energy transfer path: path (3)→path (1)→path (2)→path (4) is selected for transferring the energy to the output terminals, as shown FIG. 7B. When the difference between the loading current $I_{OA}$ and $J_{OB}$ gets wider, the system will automatically bypass the path (3) and the entire system merely use the energy transfer path: path (1)→path (2)→path (4) to transfer the energy to the output terminals. If the difference between the loading current $I_{OA}$ and $I_{OB}$ gets more wider, this only remains the energy path: path (2)→path (4) to transfer energy to the output terminals. By the bypass transfer switch mechanism, the switch times of the power-stage switches are decreased when the difference between the loading current $I_{OA}$ on the output terminal OA and the loading current $I_{OB}$ on the output terminal OB is too wide for effectively decreasing the conduction loss and the switching loss so as to increase the transfer efficiency of the entire power converter. Thereby, the present invention may apply in wide region, for example, portable electronic products.

Compared the present invention and the tradition system, the present invention decreases freewheel to decrease the usage of the power-stage switch, and further decrease the conduction loss and switch loss of the power-stage element. Additionally, the switch mode disclosed by the present invention further obviously decreases the cross regulation and can apply in any loading mode. Moreover, the present invention performs the bypass transfer switch mode to decrease the conduction loss and the switching loss of the power-stage element in the specific loading status so as to increase the transfer effect of the entire system.

The invention being thus aforesaid, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A Single Inductor Double Output (SIDO) power converter, comprising:
  a power-stage circuit, comprising an inductor, a first output terminal and a second output terminal;
  a first error amplifier, coupled to the first output terminal, for outputting a first error signal;

a second error amplifier, coupled to the second output terminal, for outputting a second error signal;

a current sensing circuit, for detecting a current of the inductor and outputting a first signal; and a comparing unit, coupled to the power-stage circuit and the current sensing circuit, for receiving the first error signal, the second error signal and the first signal, and adding the first error signal to the second error signal for generating a third error signal, and respectively comparing the first signal with the first error signal, the second error signal and the third error signal for generating a first comparison signal, a second comparison signal and a third comparison signal;

wherein the power-stage circuit determines the energy transfer path according to the first, second and third comparison signals.

2. The SIDO power converter as recited in claim 1, further comprising:

a mode exchange circuit, for receiving the first and second error signals, and comparing the first error signal and the second error signal for generating a switch signal.

3. The SIDO power converter as recited in claim 2, further comprising:

a logic device, for receiving the first, second and third comparison signals for generating a first path signal and a second path signal.

4. The SIDO power converter as recited in claim 3, wherein the logic device selects one of the first path signal and the second path signal according to the switch signal.

5. The SIDO power converter as recited in claim 3, wherein the logic device further comprises:

at least three flip-flops, for receiving and record the first, second and third comparison signals;

at least two decoders, for receiving the first, second and third comparison signals from the at least three flip-flop and outputting the first path signal and the second path signal; and a multiplexer, for selecting one of the first path signal and the second path signal according to the switch signal.

6. The SIDO power converter as recited in claim 5, wherein the flip-flop is D-type flip-flop.

7. The SIDO power converter as recited in claim 5, further comparing:

a driver, coupled to the logic device, for receiving one of the first path signal and the second path signal to drive the power-stage circuit.

8. The SIDO power converter as recited in claim 1, wherein the comparing unit further comprises:

an adder, for receiving the first error signal and the second error signal, and adding the first error signal to the second error signal for generating the third error signal;

a first comparator, for receiving the first signal and the first error signal, and comparing the first signal with the first error signal for generating the first comparison signal;

a second comparator, for receiving the first signal and the second error signal, and then comparing the first signal and the second error signal for generating the second comparison signal; and a third comparator, for receiving the first signal and the third error signal for generating the third comparison signal.

9. The SIDO power converter as recited in claim 1, wherein the power-stage circuit comprises:

a first switch, located between a first terminal of the inductor and an input terminal;

a second switch, located between the first terminal of the inductor and a ground;

a third switch, located between a second terminal of the inductor and the first output terminal; and a fourth switch, located between the second terminal of the inductor and the second output terminal.

10. A driving method for a Single Inductor Double Output (SIDO) power converter comprising: generating a first error signal, a second error signal and a first signal from a current sensing circuit for detecting a current of the inductor; adding the first error signal to the second error signal for generating a third error signal; and respectively comparing the first signal with the first error signal, the second error signal and the third error signal for generating a first comparison signal, a second comparison signal and a third comparison signal.

11. The driving method recited in claim 10, further comprising:

comparing the first error signal and the second error signal for generating a switch signal.

12. The driving method recited in claim 11, further comprising:

receiving the first, second and third comparison signals for generating a first path signal and the second path signal, and selectively outputting one of the first path signal and the second path signal according to the switch signal.

13. The driving method recited in claim 12, further comparing:

receiving the first path signal or the second path signal to drive a power-stage circuit.

* * * * *